(12) United States Patent
Hull

(10) Patent No.: US 6,764,130 B1
(45) Date of Patent: Jul. 20, 2004

(54) MULTI POSITION TAILGATE FOR DUMP TRAILERS

(75) Inventor: Curtis Hull, Clarinda, IA (US)

(73) Assignee: H & H Trailer Company, Inc., Clarinda, IA (US)

( * ) Notice: Subject to any disclaimer, the term of this patent is extended or adjusted under 35 U.S.C. 154(b) by 0 days.

(21) Appl. No.: 10/656,765

(22) Filed: Sep. 5, 2003

(51) Int. Cl.$^7$ .............................. B60J 5/06; B62D 25/24
(52) U.S. Cl. ..................... 296/186.4; 296/50; 296/56; 296/57.1
(58) Field of Search ..................... 296/182.1, 183.1, 296/183.2, 186.3, 186.4, 50, 56, 57.1, 60, 146.8, 146.11, 146.12

(56) References Cited

U.S. PATENT DOCUMENTS

| | | | |
|---|---|---|---|
| 2,506,849 A | 5/1950 | Winterton | 296/51 |
| 2,806,735 A | 9/1957 | Smith | 296/51 |
| 2,821,431 A | 1/1958 | Crompton | 296/57 |
| 3,155,203 A | 11/1964 | Kappen | 189/46 |
| 3,309,133 A | 3/1967 | Butler | 296/51 |
| 3,912,326 A | 10/1975 | Tass | 296/51 |
| 3,972,428 A | 8/1976 | Love, Jr. et al. | 214/85 |
| 4,076,301 A | 2/1978 | Gergoe | 296/50 |
| 4,691,956 A * | 9/1987 | Hodge | 296/51 |
| 5,211,437 A | 5/1993 | Gerulf | 296/61 |
| 5,685,594 A | 11/1997 | Harper | 296/51 |
| 2002/0070575 A1 * | 6/2002 | Leftridge | 296/56 |
| 2002/0105202 A1 * | 8/2002 | Ziv-Av | 296/56 |

* cited by examiner

*Primary Examiner*—D. Glenn Dayoan
*Assistant Examiner*—Patricia Engle
(74) *Attorney, Agent, or Firm*—Wm. Bruce Day

(57) ABSTRACT

A tailgate for a load carrying body, such as a dump trailer, is selectively openable to various positions, including left opening, right opening, swing up and swing down. Variable opening positions maximize flexibility for the owner/operator. A left or right swing opening is enable by removeable and storable hinge pins. An up or down opening is enable by latches, which are openable and operate as hinges when closed.

3 Claims, 5 Drawing Sheets

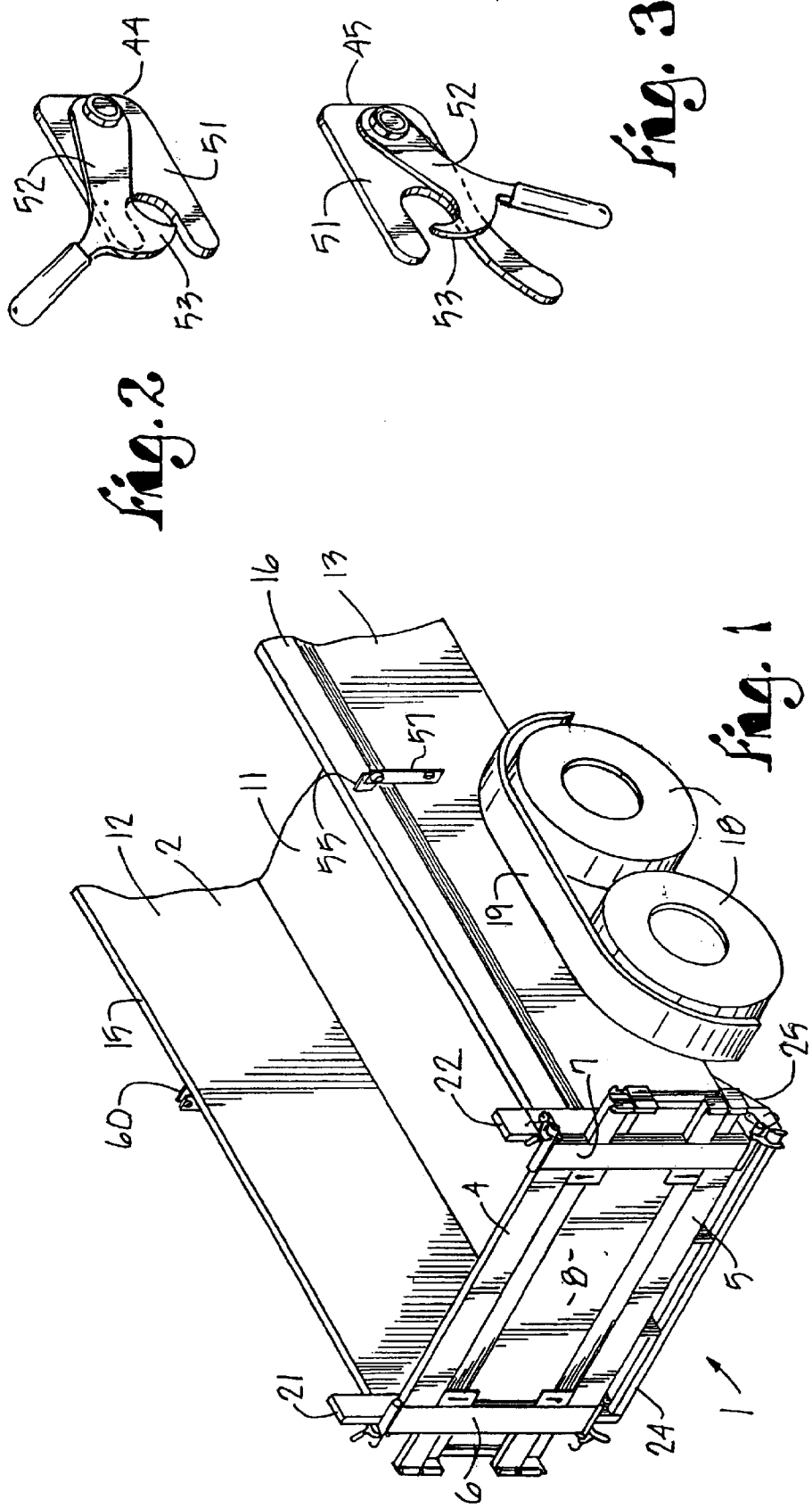

MULTI POSITION TAILGATE FOR DUMP TRAILERS

FIELD OF THE INVENTION

This invention relates to tailgates for vehicles, and in particular relates to tailgates which are swingable in multiple relations.

BACKGROUND OF THE INVENTION

It is conventional for some vehicle tailgates to rotate about both a horizontal and a vertical axis. Such tailgates may swing open horizontally as a door to permit closure or access to a bed, or may be swung downwardly about a horizontal axis to permit loading or to carry objects which project rearwardly from the vehicle bed. Various tailgate assemblies have been developed, including split tailgates, such as shown in U.S. Pat. No. 5,685,594, which include both a sideward opening component and a lay down hinge assembly as in a conventional pick-up truck bed tailgate. Some known tailgate assemblies are intended to provide a universal opening function, such as U.S. Pat. No. 2,806,735. However, such assemblies offer a split tailgate arranged in side-by-side doors, wherein each door swings vertically open so that one half door is on one side and the remaining half door is on the other side. The two halves are connectable, so that the tailgate formed by the door halves can swing up or down in a unitary manner. The difficulty with these split gate or door assemblies is that the two halves are often not well connected, and are not sturdy enough to withstand a load placed thereon, such as is the usual case with a pick-up truck bed, or a dump truck bed.

OBJECTS OF THE INVENTION

The objects of the present invention are to provide an tailgate for a load vehicle which can be swung as a door left or right, and operate as a tailgate swung up or down, to provide such a tailgate which is sufficiently study for heavy loads; and to provide such a tailgate which is well suited for the intended purpose.

SUMMARY OF THE INVENTION

To address these needs for a truly universal tailgate, which can withstand heavy loads being placed thereon, applicants invention is a tailgate for a load carrier vehicle and comprises a single tailgate section secured to a bed of a load carrier vehicle by left and right hinge assemblies. The hinge assemblies are readily disconnectable on either side so that the entire tailgate may swing left or right. The tailgate is also secured to the vehicle bed by top and bottom sets of latch assemblies which are readily operable and disconnectable by an operator for selective vertical swinging of the tailgate from a selected top or bottom set of the latch assemblies. The tailgate thus is selectively able to swing horizontally left or right about vertical axes or the tailgate is able to swing vertically from the top or the bottom about horizontal axes.

BRIEF DESCRIPTION OF THE DRAWINGS

FIG. 2 is a perspective view of a top latch assembly.

FIG. 3 is a perspective view of a bottom latch assembly.

FIG. 7 is a fragmentary, side elevational view showing the tailgate assembly swung open at its top.

DESCRIPTION OF THE PREFERRED AND ALTERNATE EMBODIMENTS

Figure 1:
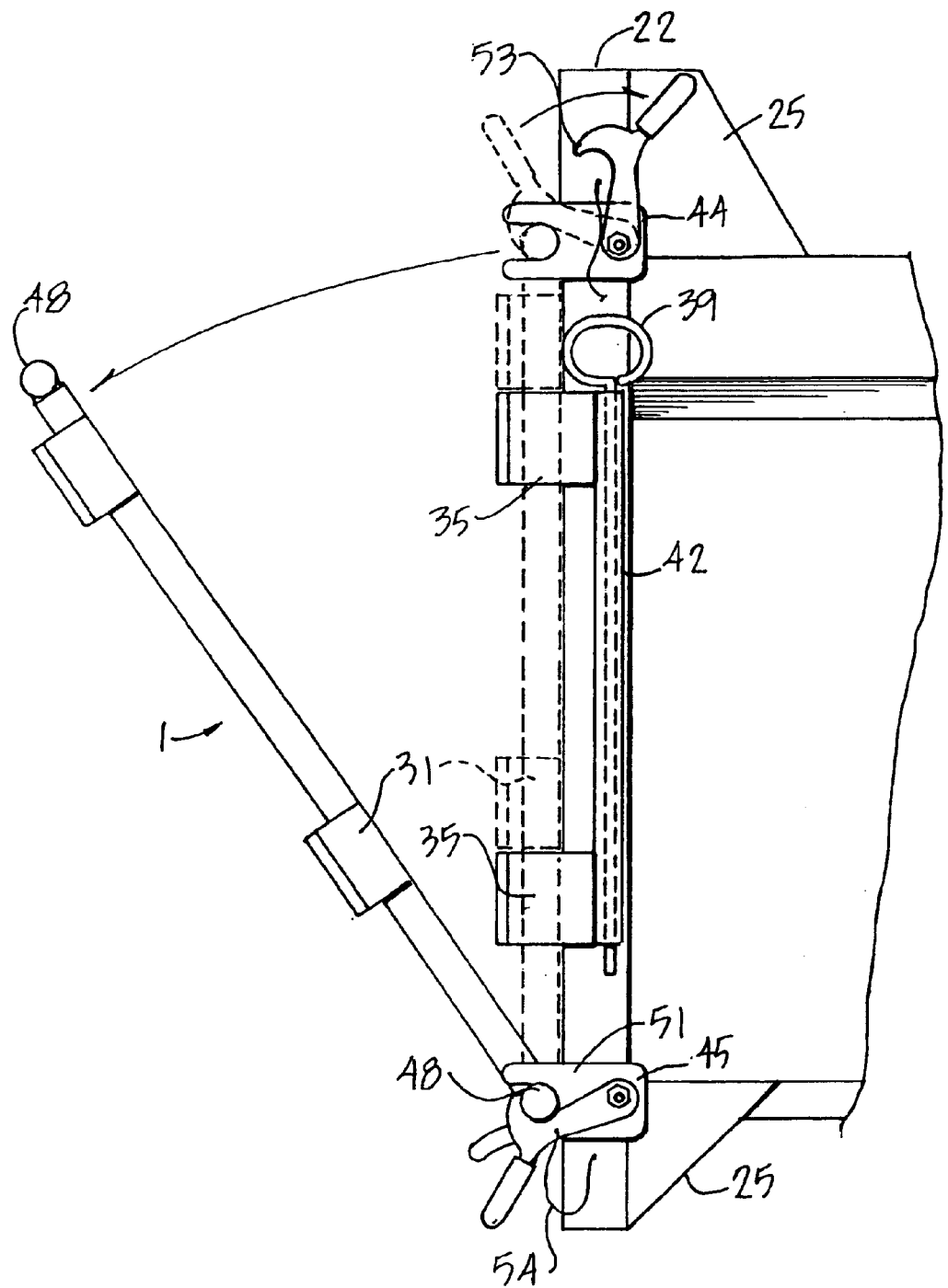
FIG. 1 is perspective view of a tailgate assembly joined to a load carrying vehicle bed.

As required, a preferred embodiment of the present invention is illustrated in the drawings and disclosed in the written specification hereinafter following. However, the drawings and description are not intended to be limiting, but to merely disclose the preferred embodiment of the invention. The invention is a tailgate assembly 1, FIG. 1, which secures to a bed 2 of a load carrier vehicle. The load carrier vehicle may be a trailer, such as shown in the present embodiment, or it may be a truck bed; in either case, the tailgate assembly is equally advantageous.

The tailgate assembly 1 is selectively able to swing horizontally left or right about left or right vertical hinge axes or selectively able to swing vertically from top or bottom, about horizontal hinge axes, providing the operator with great versatility to load and unload the material to be carried in the vehicle.

Figure 4:
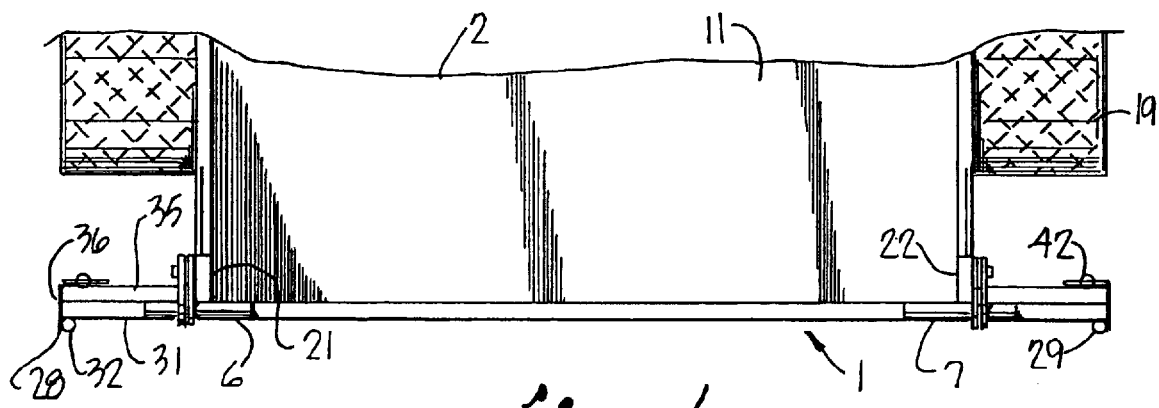
FIG. 4 is a fragmentary, top plan view of the tailgate assembly joined to the bed.
Figure 5:
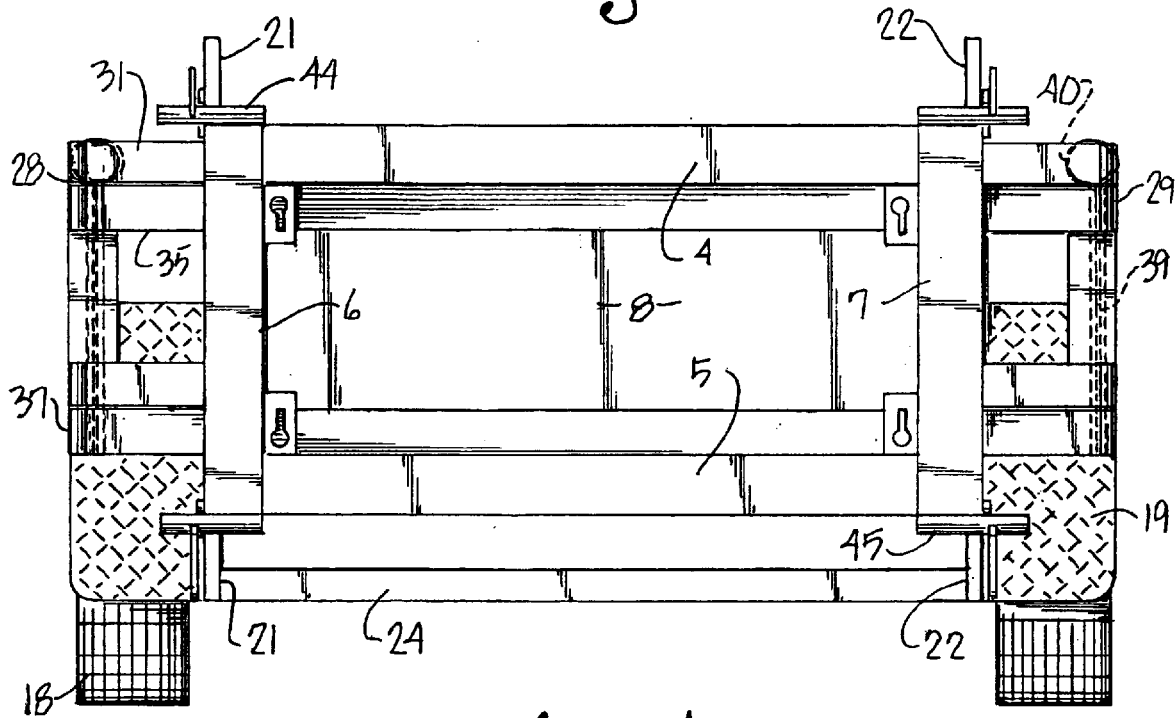
FIG. 5 is a rear elevational view of the bed and tailgate assembly.

Referring to FIGS. 4 and 5, the tailgate assembly 1 is specifically constructed for heavy load bearing and consists of a framework of top and bottom beams 4 and 5, left and right side beams 6 and 7, and a central panel 8 secured to the beams 4, 5, 6 and 7.

The bed 2 is similarly heavy duty and consists of sturdy bed and side panels 11, 12 and 13. Top beams 15 and 16 extend along the upper margins of the side panels 12 and 13 and the bed 2 is underlain and made rigid by additional beams (not shown). Wheels 18, such as the dual axle wheels illustrated, support the bed 2 and extend to the side of the side panels 12 and 13. Fenders 19 extend over the tops of the wheels 18.

End beams 21 and 22 are uprights to which the tailgate assembly 1 attaches. The beams 21 and 22 extend below the level of the bed panel 11 and are rigidified by a cross beam 24 below the bed 11 and by upper and lower gussets 25.

The tailgate assembly 1 has left and right hinge assemblies 28 and 29 extending from left and right ends of the tailgate assembly 1 and left and right side wall ends of the bed 2. Each hinge assembly comprises mating components respectively attached to the tailgate ends and to the side wall ends. The mating components are joined by a hinge rod which is readily removable by a operator for selective horizontal swinging of the tailgate assembly 1 upon a selected right or left hinge assembly 28 or 29. In the illustrated example, each of the hinge assemblies 28 and 29 consists of an arm 31 secured to and extending outwardly of the respective side beams 6 or 7, and with a hinge ear coil 32 secured to the remote end of the arm 31 at its rearward termination, as shown in FIG. 4. This same configuration of arm 31 and hinge ear coil 32 is repeated in top and bottom arms as shown in FIG. 5 on each side. Immediately beneath each of the arms 31 extended from the tailgate assembly 1 are arms 35 extended from the bed 2, and specifically, extending the respective bed end beam 21 or 22. An "L" shaped bracket 36 extends rearwardly from the remote of the arm 35 and terminates in a hinge ear coil 37 situated immediately under and aligned with the hinge ear coil 32 of the arm 31. This same structure exists in top and bottom sets and on both sides of the tailgate assembly 1 as shown in FIG. 5. An elongate hinge rod 39 with a top loop 40 connects the upper and lower hinge assemblies together so that the tailgate assembly 1 will swing horizontally about the vertical access of the hinge rod 39, either left or right, depending upon which hinge rod 39 is left connecting the hinge assemblies and which one is removed. The hinge rods 39 are easily removable by the operator simply grasping the top loop 40 pulling upward. The hinge rod 40 is stowed in a convenient storage sheath 42 located behind the hinge assemblies 28 and 29 for each side.

To open from the top or the bottom of the tailgate, top and bottom sets of latch assemblies 44 and 45 are provided. Each latch assembly set includes a receiver 47 which rotates relative to an insert member 48. In the illustrated example, the latch assemblies are in the mechanical form of a pin and yoke arrangement, each consisting of a pin 50 extending horizontally from the top and bottom, respectively, of the side beams 6 and 7. The pin forms a sturdy hinge rod with a free end which is received in a yoke 51, with pairs of the yoke 51 respectively connected to tops and bottoms of the bed end beams 21 and 22. The yoke 51 is sized for receipt of the pin 50, which is selectively retained in the yoke 51 by a hinged locking lever 52 with a radiused end hook 53 to fit around the end of the rod 48 which is received in the yoke 51 and prevents its disengagement. The locking lever 52 is secured in position by a tethered pin 54.

For top opening of the tailgate assembly 1, so that it swings downwardly about a horizontal axis, FIG. 7, the top set of latch assemblies 44 are released, making sure that the bottom set of latch assemblies 45 are fully closed and pinned against opening. The one then swings downwardly, FIG. 7. The tailgate assembly 1 can also be used in a conventional dump truck type relation wherein the tailgate regulates and distributes the amount of material being dumped from the bed. This is particularly useful in tilt dump bed relations. To accomplish upward swinging, the opposite procedure from that of FIG. 7 is used. The bottom set of latch assemblies 45 are released with the top set latch assemblies 44 locked and pinned. This enables the tailgate assembly 1 to swing upon the top pins 50, FIG. 6.

Figure 6:
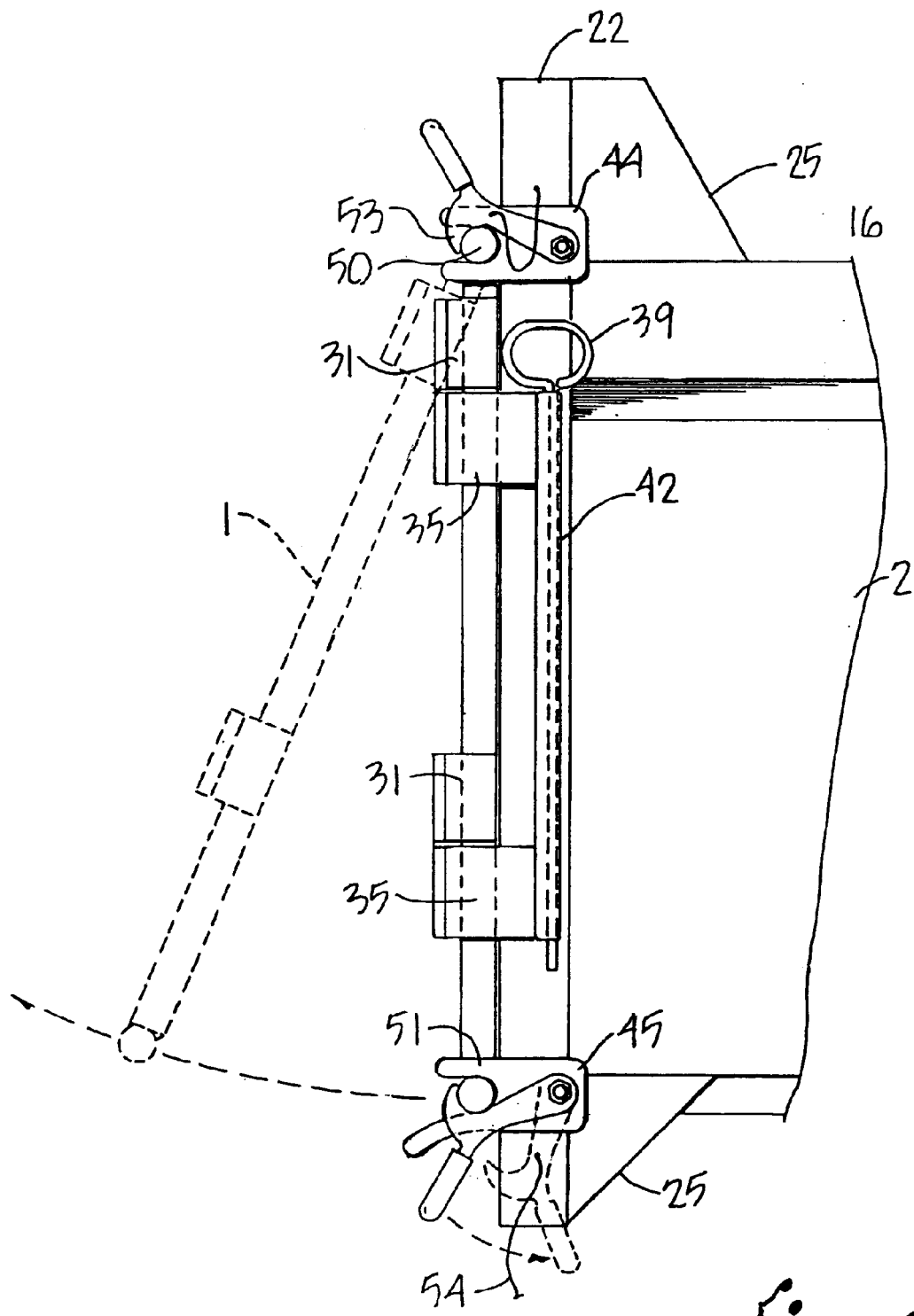
FIG. 6 is a fragmentary, side elevational view showing the tailgate assembly swung open at its bottom.
Figure 8:
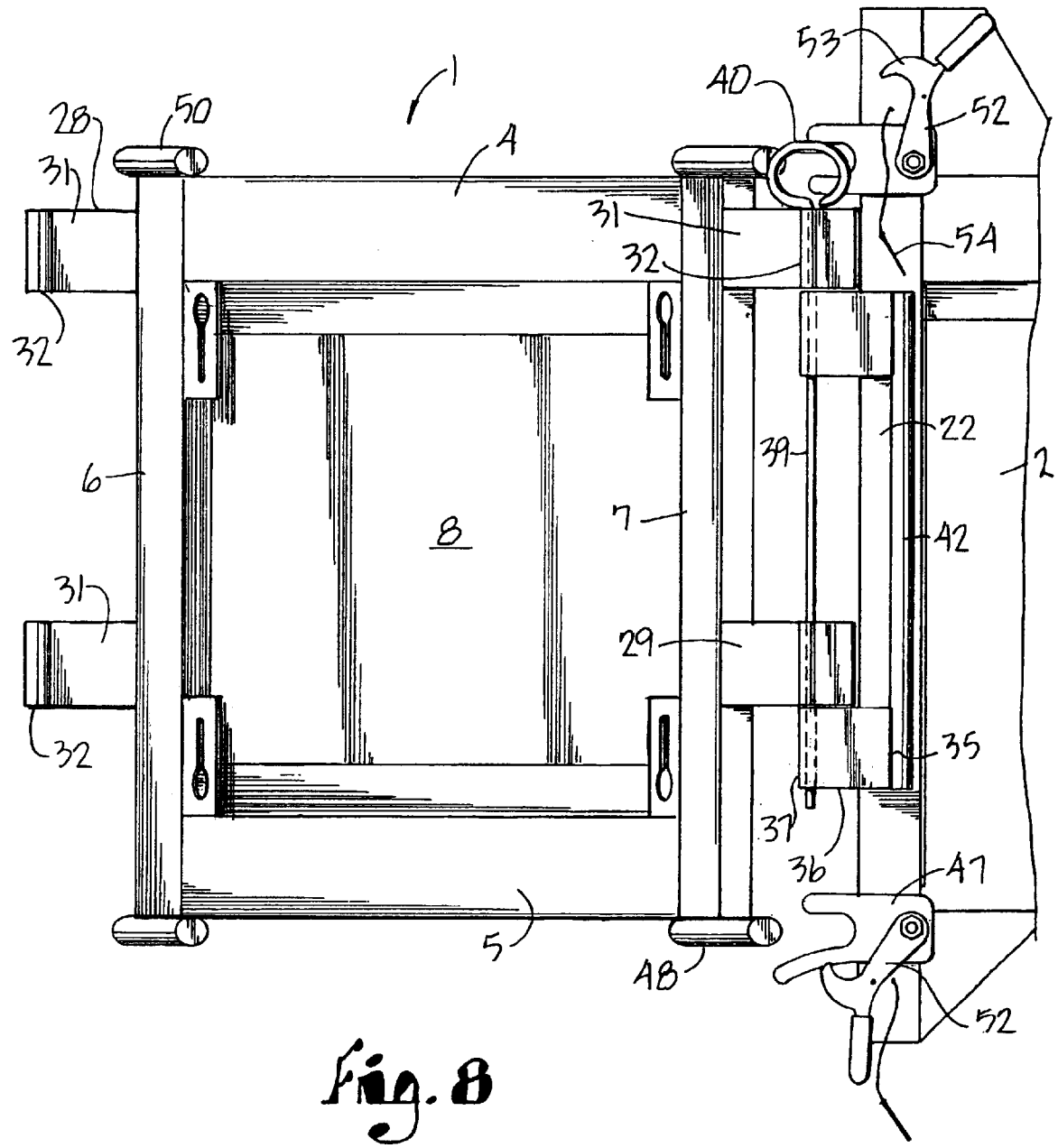
FIG. 8 is a fragmentary, side elevational view showing the tailgate assembly swung open from one of its two sides.

Accordingly, the tailgate assembly 1 can be used either for top swinging or bottom swinging about a horizontal axis, FIGS. 6 and 7, or can be used so that the whole tailgate assembly 1 swings open from either left or right side, FIG. 8. The tailgate assembly 1 can be swung fully parallel with the sides of the vehicle bed 2. This is accomplished because the extension of the arms 31 and 35 is selected to accommodate the distance the wheels 18 and fender 19 extends outwardly from the side of the dump body. Thus, when swung fully open to either side, the tailgate assembly 1 parallels the side of the dump body. To retain the tailgate assembly 1 to the open swung position, a retainer or keeper 55 is provided which consists of a rigid bar or strap 57 with an end opening 58 sized to fit over the pin 50 of the open end of the tailgate assembly 1. The strap 57 is spring connected to a mount 60 secured to the bed top beam 15 or 16 respectively, so that there is sufficient play between the strap 57 and the mount 60, so that the strap 57 can be manipulated to fit over the pin end.

While certain forms of the invention have been described and disclosed herein, the invention is not to be so limited except insofar as set forth in the following claims.

What is claimed is:

1. A tailgate assembly for a load carrier vehicle having a bed with spaced side walls and comprising:

a) left and right hinge assemblies extending from left and right ends of the tailgate assembly and left and right side wall ends of the vehicle bed, each hinge assembly comprising mating components respectively attached to the tailgate ends and to the sidewall ends and joined by a hinge rod, the hinge rod being readily removable by an operator as a whole upon a selected left or right hinge assembly;

b) top and bottom sets of latch assemblies extending from left and right ends of the tailgate assembly and left and right side wall ends of the vehicle bed, each latch assembly comprising mating components respectively attached to the tailgate end and to the side wall ends, the latch assembly being readily operable by an operator for selective vertical swinging of said tailgate as a whole upon a selected top or bottom set of latch assemblies;

c) wherein said tailgate is selectively able to swing horizontally left or right and swing vertically from top or bottom.

2. The tailgate assembly set forth in claim 1 including a storage pocket for receiving said hinge rod when said hinge rod is removed.

3. A dump trailer having a selectively swingable tailgate assembly and comprising:

a) a dump bed having a flat bed front end wall and spaced left and right side walls;

b) a tailgate assembly spanning an open rear end fo the dump bed;

c) left and right hinge assemblies connecting the tailgate to the dump bed, each hinge assembly having mating components connected to the respective dump bed and tailgate, the mating components being connected to each other by a readily removable hinge pin so that when said right hinge pin is inserted and the left hinge pin removed, the entire tailgate swings horizontally from its right side and vice versa;

d) a sleeve for storage of each of said hinge pins when removed;

e) retainers on each side of the dump bed to hold the tailgate open when swung open toward a selected side;

f) top and bottom latch assemblies extending from left and right ends of the tailgate and connected to the dump bed, each latch assembly including a receiver member and a locking member and being readily operable by an operator for selective vertical swinging of the entire tailgate upon a selected top or bottom set of latch assemblies;

g) wherein the entire tail gate is selectively able to swing horizontally left or right and swing vertically from top to bottom.

\* \* \* \* \*